US008503547B2

(12) United States Patent
Luo et al.

(10) Patent No.: US 8,503,547 B2
(45) Date of Patent: Aug. 6, 2013

(54) SCRAMBLING CODES FOR SECONDARY SYNCHRONIZATION CODES IN WIRELESS COMMUNICATION SYSTEMS

(75) Inventors: Tao Luo, San Diego, CA (US); Arun P. Kannu, San Diego, CA (US); Ke Liu, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1100 days.

(21) Appl. No.: 12/245,931

(22) Filed: Oct. 6, 2008

(65) Prior Publication Data

US 2009/0122839 A1 May 14, 2009

Related U.S. Application Data

(60) Provisional application No. 60/979,357, filed on Oct. 11, 2007.

(51) Int. Cl.
*H04K 1/10* (2006.01)

(52) U.S. Cl.
USPC .......................................... 375/260; 375/259

(58) Field of Classification Search
USPC ......................................................... 375/260
See application file for complete search history.

(56) References Cited

U.S. PATENT DOCUMENTS

| 6,404,732 | B1 | 6/2002 | Van Nee |
| 6,539,004 | B1 | 3/2003 | Sawyer |
| 6,826,244 | B2 | 11/2004 | Demir et al. |
| 6,865,177 | B1 | 3/2005 | Park et al. |
| 7,158,505 | B2 * | 1/2007 | Dick et al. ..................... 370/350 |
| 7,433,437 | B2 | 10/2008 | Demir et al. |
| 7,535,860 | B2 * | 5/2009 | Park et al. ...................... 370/310 |
| 7,536,014 | B2 * | 5/2009 | Kim et al. ..................... 380/268 |
| 7,738,437 | B2 * | 6/2010 | Ma et al. ....................... 370/342 |
| 8,009,701 | B2 * | 8/2011 | Luo et al. ...................... 370/503 |

(Continued)

FOREIGN PATENT DOCUMENTS

| JP | 11331041 A | 11/1999 |
| JP | 2006025415 A | 1/2006 |

(Continued)

OTHER PUBLICATIONS

International Search Report/Written Opinion—PCT/US08/079139—International Search Authority EPO—Jan. 13, 2009.

(Continued)

*Primary Examiner* — Chieh M Fan
*Assistant Examiner* — Santiago Garcia
(74) *Attorney, Agent, or Firm* — Larry Moskowitz

(57) ABSTRACT

Systems and methodologies are described that facilitate employing a scrambling code from a set of scrambling codes, which is indexed by primary synchronization codes (PSCs), to scramble or descramble a secondary synchronization code (SSC). The scrambling codes in the set can be designed to optimize peak-to-average power ratios and/or mitigate cross correlation. For example, the scrambling codes can be based on different M-sequences generated from disparate polynomials. In accordance with another example, the scrambling codes can be based on different cyclic shifts of the same M-sequence. According to another example, the scrambling codes can be based upon binary approximations of possible primary synchronization codes utilized in a wireless communication environment. Pursuant to a further example, the scrambling codes can be based on different Golay complementary sequences.

22 Claims, 10 Drawing Sheets

U.S. PATENT DOCUMENTS

| | | | |
|---|---|---|---|
| 2002/0075833 A1* | 6/2002 | Dick et al. | 370/336 |
| 2002/0146039 A1 | 10/2002 | Demir et al. | |
| 2004/0128533 A1* | 7/2004 | Choi et al. | 713/200 |
| 2004/0142712 A1* | 7/2004 | Rudolf | 455/502 |
| 2004/0246998 A1* | 12/2004 | Ma et al. | 370/527 |
| 2005/0221848 A1* | 10/2005 | Chitrapu et al. | 455/502 |
| 2005/0271177 A1 | 12/2005 | Demir et al. | |
| 2005/0286460 A1 | 12/2005 | Mottier et al. | |
| 2006/0028976 A1* | 2/2006 | Park et al. | 370/203 |
| 2007/0230596 A1 | 10/2007 | Veen et al. | |
| 2008/0019350 A1* | 1/2008 | Onggosanusi et al. | 370/350 |
| 2008/0107086 A1 | 5/2008 | Fukuta et al. | |
| 2008/0132263 A1* | 6/2008 | Yu et al. | 455/515 |
| 2008/0285529 A1* | 11/2008 | Kwak et al. | 370/338 |
| 2009/0046702 A1* | 2/2009 | Luo et al. | 370/350 |
| 2009/0067370 A1* | 3/2009 | Kim et al. | 370/328 |
| 2009/0073939 A1* | 3/2009 | Panico | 370/335 |
| 2009/0122839 A1* | 5/2009 | Luo et al. | 375/145 |
| 2009/0238137 A1* | 9/2009 | Kishiyama et al. | 370/330 |
| 2009/0310782 A1* | 12/2009 | Dabak et al. | 380/255 |
| 2010/0177740 A1* | 7/2010 | Lim et al. | 370/335 |
| 2010/0182966 A1 | 7/2010 | Kishiyama et al. | |

FOREIGN PATENT DOCUMENTS

| | | |
|---|---|---|
| JP | 2008141741 A | 6/2008 |
| JP | 2009027211 A | 2/2009 |
| RU | 2242091 C2 | 12/2004 |
| RU | 2258311 C2 | 8/2005 |
| WO | WO0118987 A1 | 3/2001 |
| WO | WO0126269 A1 | 4/2001 |
| WO | WO0213548 A2 | 2/2002 |
| WO | WO03094389 | 11/2003 |

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.

ETRI: "S-SCH Scrambling Methods", 3GPP R1-074053, Oct. 2, 2007. <URL:http://www.3gpp.org/ftp/tsg_ran/WG1_RL1/TSGR1_50b/Docs/R1-074053.zip>.

LG Electronics: "SSC mapping and scrambling method", 3GPP R1-074210, Oct. 2, 2007. <URL:http://www.3gpp.org/ftp/tsg_ran/WG1_RL1/TSGR1_50b/Docs/R1-074210.zip>.

Motrola: "P-SCH Design Requirements and Proposal", 3GPP R1-071315, Mar. 30, 2007.

NTT DoCoMo et al., "Investigation on P-SCH Specific Scrambling Sequences for S-SCH", 3GPP R1-074293 3GPP TSG-RAN WG1#50b R1-074293, Oct. 2, 2007 <http://www.3gpp.org/ftp/tsg_ran/WG1_RL1/TSGR1_50b/Docs/R1-074293.zip>.

Taiwan Search Report—TW097139048—TIPO—Jan. 10, 2012.

ZTE: "An Interleaved Multiplexing Method for S-SCH Sequences", 3GPP R1-073591, Aug. 25, 2007.

Taku O., et al., "Orthogonal Variable Spreading Factor Code Selection for Peak Power Reduction in Multi-Rate OFCDM Systems," Technical Report of the Institute of Electronics, Information and Communication Engineers, Jan. 10, 2003, vol. 102, No. 545, pp. 79-84, RCS2002-266.

* cited by examiner

SCRAMBLING CODES FOR SECONDARY SYNCHRONIZATION CODES IN WIRELESS COMMUNICATION SYSTEMS

CROSS-REFERENCE TO RELATED APPLICATIONS

This application claims the benefit of U.S. Provisional Patent Application Ser. No. 60/979,357 entitled "LTE RLC POLLING AND STATUS REPORT TIMING" which was filed Oct. 11, 2007. The entirety of the aforementioned application is herein incorporated by reference.

BACKGROUND

I. Field

The following description relates generally to wireless communications, and more particularly to employing scrambling codes to scramble secondary synchronization codes in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Synchronization codes can be employed in wireless communication environments to enable cells to be detected, identified, and the like. For instance, a primary synchronization code (PSC) (e.g., from a set of PSCs) and a secondary synchronization code (SSC) (e.g., from a set of SSCs) can be used by a base station to enable access terminal(s) to acquire timing information, sequencing information, cell identification (ID) information, and so forth from the base station. For instance, a particular combination of PSC and SSC used by a given base station can indicate a cell ID corresponding to the base station. Accordingly, an access terminal can receive and detect the PSC and SSC from a base station, and based thereupon, can recognize timing information, sequencing information, cell ID related to the base station, and the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of a scrambling code from a set of scrambling codes, which is indexed by primary synchronization codes (PSCs), to scramble or descramble a secondary synchronization code (SSC). The scrambling codes in the set can be designed to optimize peak-to-average power ratios and/or mitigate cross correlation. For example, the scrambling codes can be based on different M-sequences generated from disparate polynomials. In accordance with another example, the scrambling codes can be based on different cyclic shifts of the same M-sequence. According to another example, the scrambling codes can be based upon binary approximations of possible primary synchronization codes utilized in a wireless communication environment. Pursuant to a further example, the scrambling codes can be based on different Golay complementary sequences.

According to related aspects, a method that facilitates scrambling synchronization codes in a wireless communication environment is described herein. The method can include selecting a scrambling code from a set of possible scrambling codes as a function of an index of a primary synchronization code (PSC), the possible scrambling codes in the set being designed to minimize a peak-to-average power ratio and minimize a cross-correlation. Further, the method can comprise scrambling a secondary synchronization code (SSC) with the selected scrambling code. Moreover, the method can include transmitting the scrambled SSC.

Another aspect relates to a wireless communications apparatus. The wireless communications apparatus can include a memory that retains instructions related to selecting a scrambling code from a set of possible scrambling codes as a function of an index of a primary synchronization code (PSC), the possible scrambling codes in the set being designed to minimize a peak-to-average power ratio and minimize a cross-correlation, scrambling a secondary synchronization code (SSC) with the selected scrambling code, and transmitting the scrambled SSC. Further, the wireless communications apparatus can include a processor, coupled to the memory, configured to execute the instructions retained in the memory.

Yet another aspect relates to a wireless communications apparatus that enables employing scrambling signals for a secondary synchronization code in a wireless communication environment. The wireless communications apparatus can include means for selecting a scrambling code from a set of possible scrambling codes based upon an index of a primary synchronization code (PSC), the possible scrambling codes in the set being designed to minimize a peak-to-average power ratio and minimize cross-correlation. Moreover, the wireless communications apparatus can include means for scrambling a secondary synchronization code (SSC) with the selected scrambling code. Further, the wireless communications apparatus can include means for sending the scrambled SSC over a downlink.

Still another aspect relates to a computer program product that can comprise a computer-readable medium. The computer-readable medium can include code for selecting a scrambling code from a set of possible scrambling codes as a function of an index of a primary synchronization code (PSC), the possible scrambling codes in the set being designed to minimize a peak-to-average power ratio and minimize a cross-correlation. Further, the computer-readable medium can include code for scrambling a secondary synchronization code (SSC) with the selected scrambling code. Moreover, the computer-readable medium can comprise code for transmitting the scrambled SSC.

In accordance with another aspect, an apparatus in a wireless communication system can include a processor, wherein the processor can be configured to select a scrambling code from a set of possible scrambling codes based upon an index of a primary synchronization code (PSC), the possible scrambling codes in the set being designed to minimize a peak-to-average power ratio and minimize cross-correlation. Moreover, the processor can be configured to scramble a secondary synchronization code (SSC) with the selected scrambling code.

According to other aspects, a method that facilitates descrambling received synchronization codes in a wireless communication environment is described herein. The method can include decoding a received primary synchronization code (PSC) to identify a PSC index. Moreover, the method can comprise recognizing a base station-employed scrambling code from a set of possible scrambling codes as a function of the PSC index, the possible scrambling codes in the set being designed to minimize a peak-to-average power ratio and minimize cross-correlation. Further, the method can include decoding a received secondary synchronization code (SSC) using the base station-employed scrambling code.

Yet another aspect relates to a wireless communications apparatus that can include a memory that retains instructions related to decoding a received primary synchronization code (PSC) to identify a PSC index, recognizing a base station-employed scrambling code from a set of possible scrambling codes as a function of the PSC index, the possible scrambling codes in the set being designed to minimize a peak-to-average power ratio and minimize cross-correlation, and decoding a received secondary synchronization code (SSC) using the base station-employed scrambling code. Further, the wireless communications apparatus can comprise a processor, coupled to the memory, configured to execute the instructions retained in the memory.

Another aspect relates to a wireless communications apparatus that enables descrambling a received secondary synchronization code in a wireless communication environment. The wireless communications apparatus can include means for determining a base station-employed scrambling code from a set of scrambling codes as a function of an index corresponding to a received primary synchronization code (PSC), the scrambling codes in the set being designed to minimize a peak-to-average power ratio and minimize cross-correlation. Further, the wireless communications apparatus can comprise means for descrambling a received secondary synchronization code (SSC) utilizing the base station-employed scrambling code.

Still another aspect relates to a computer program product that can comprise a computer-readable medium. The computer-readable medium can include code for determining a base station-employed scrambling code from a set of scrambling codes as a function of an index corresponding to a received primary synchronization code (PSC), the scrambling codes in the set being designed to minimize a peak-to-average power ratio and minimize cross-correlation. Moreover, the computer-readable medium can include code for descrambling a received secondary synchronization code (SSC) utilizing the base station-employed scrambling code.

In accordance with another aspect, an apparatus in a wireless communication system can include a processor, wherein the processor can be configured to determine a base station-employed scrambling code from a set of scrambling codes as a function of an index corresponding to a received primary synchronization code (PSC), the scrambling codes in the set being designed to minimize a peak-to-average power ratio and minimize cross-correlation. Moreover, the processor can be configured to descramble a received secondary synchronization code (SSC) utilizing the base station-employed scrambling code.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
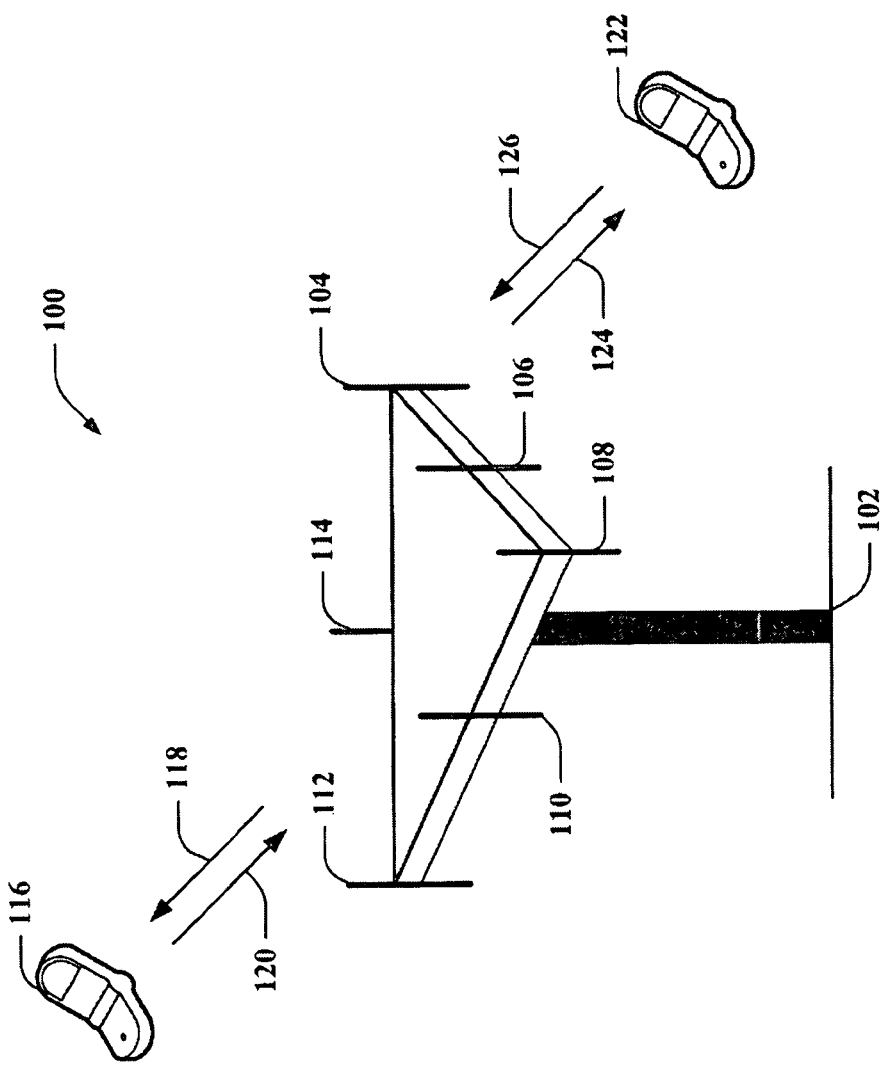
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

A cell can refer to a coverage area serviced by a base station. A cell can further include one or more sectors. For simplicity and clarity, the term "sector" can be used herein to refer to a cell, or a section of a cell, serviced by a base station. The terms "access terminal" and "user" can be used interchangeably, and the terms "sector" and "base station" can also be used interchangeably. A serving base station/sector can refer to a base station/sector with which an access terminal communicates.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

One or more types of synchronization signals can be transmitted by base station 102. For instance, a primary synchronization code (PSC) signal and/or a secondary synchronization code (SSC) signal can be transferred by base station 102. A primary synchronization code (PSC) signal can be a synchronization signal used for cell detection during initial cell search and a secondary synchronization code (SSC) signal can be a synchronization signal used for cell identification during initial cell search.

A primary synchronization signal can be generated based on a PSC sequence and referred to as a PSC signal. The PSC sequence can be a constant amplitude zero auto correlation (CAZAC) sequence, a pseudo-random number (PN) sequence, etc. Some example CAZAC sequences include a Chu sequence, a Zadoff-Chu sequence, a Frank sequence, a generalized chirp-like (GCL) sequence, and the like. A secondary synchronization signal can be generated based on a SSC sequence and referred to as a SSC signal. The SSC sequence can be a maximum-length sequence (M-sequence), a PN sequence, a binary sequence, etc. Further, the PSC signal can be referred to as the primary synchronization signal, PSC, etc. and the SSC signal can be referred to as the secondary synchronization signal, SSC, etc.

According to an illustration, base station 102 can employ a given combination of PSC and SSC. Thus, base station 102 can utilize a particular PSC from a set of possible PSCs and a particular SSC from a set of possible SSCs. The PSC/SSC combination utilized by base station 102 can indicate a corresponding cell identifier (ID) to access terminals 116, 122. By way of example, a wireless communication environment can support approximately 510 distinct cell IDs. Following this example, three possible PSCs (e.g., PSCs with indices 0, 1, and 2) can be used in the wireless communication environment and approximately 170 possible SSCs can be utilized, thus yielding 510 differing PSC/SSC combinations. It is to be appreciated, however, that the claimed subject matter is not limited to the foregoing example.

The set of possible cell IDs can be split into three groups (e.g., assuming that three possible PSCs are utilized in a wireless communication environment, . . . ), and the PSC can carry information regarding a particular group to which a given base station belongs. The PSC can be a first signal obtained by a searching access terminal (e.g., access terminal 116, access terminal 122, . . . ); as such, the PSC can provide physical layer information to the recipient, searching access terminal. Further, to avoid collisions between different cell IDs (e.g., randomize interference of SSCs from different base stations, . . . ), a scrambling code can be applied to scramble the SSC. The scrambling code used for the SSC can be linked to an index of a PSC utilized (e.g., group to which the transmitting base station belongs, . . . ); hence, three possible scrambling codes can be employed in the wireless communication environment (e.g., when three possible PSCs are used, . . . ).

The SSC sent by base station 102 can be scrambled by a particular scrambling code from a set of scrambling codes. Each of the scrambling codes can be a binary sequence. Further, the particular scrambling code utilized by base station 102 can be a function of the PSC employed by base station 102. Thus, an access terminal (e.g., access terminal 116, access terminal 122, . . . ) can detect an identity of a PSC received from base station 102, determine a scrambling code corresponding to the identified PSC, and decode a received SSC utilizing the determined scrambling code.

By way of illustration, three possible scrambling codes can be utilized in a wireless communication environment (e.g., Long Term Evolution (LTE) system, The three possible scrambling codes can each be a binary sequence. Moreover, the three possible scrambling codes can be designed to minimize peak-to-average power ratios and/or minimize cross correlation there between.

Figure 2:
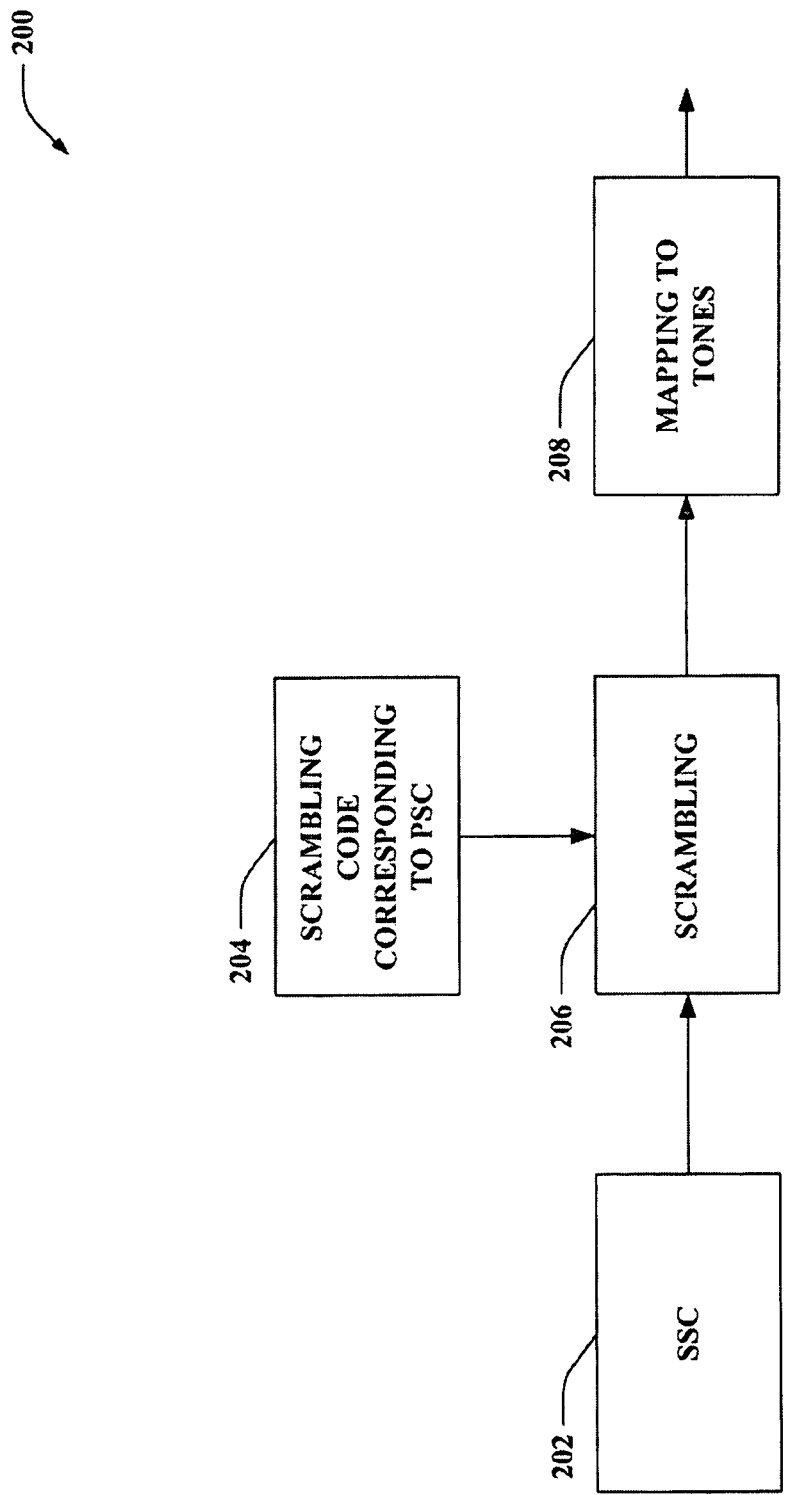
FIG. 2 is an illustration of an example schematic for scrambling synchronization codes in accordance with various aspects of the claimed subject matter.

Now referring to FIG. 2, illustrated is an example schematic 200 for scrambling synchronization codes in accordance with various aspects of the claimed subject matter. An SSC 202 to be scrambled can be selected, generated, provided, or the like. SSC 202 can be a binary sequence based on an M-sequence. Moreover, a combination of a PSC and SSC 202 can be utilized by a base station to indicate a corresponding cell ID. For example, the PSC utilized by the base station can be one of three possible PSCs and SSC 202 can be one of 170 possible SSCs.

Further, a scrambling code 204 corresponding to the PSC can be selected, generated, provided, or the like. Scrambling code 204 can be linked to an index of the PSC utilized by the base station. Thus, assuming a wireless communication environment supports use of three possible PSCs, then three possible scrambling codes can be utilized (e.g., scrambling code 204 can be one of the three possible scrambling codes, . . . ).

At 206, SSC 202 and scrambling code 204 can be scrambled. For example, SSC 202 and scrambling code 204 can be multiplied together to yield a scrambled SSC. Further, at 208, the scrambled SSC (e.g., combination of SSC 202 and scrambling code 204, . . . ) can be mapped to tones (e.g., subcarriers, . . . ) for transmission over a channel.

Various scrambling code designs can be employed in connection with the claimed subject matter. According to an example, the three possible scrambling codes can be based upon three distinct M-sequence based scrambling codes, each respectively generated from one of three different generator polynomials (e.g., disparate cyclic shift polynomials, . . . ). Following this example, three length-63 M-sequence based scrambling codes can be yielded based upon the three different generator polynomials, and one bit from each of the three length-63 M-sequence based scrambling codes can be truncated or punctured. According to another illustration, three length-31 M-sequence based scrambling codes can be generated based upon the three different generator polynomials. In such a scenario, the actual length of the scrambling codes can be less than a desired length (e.g., length of SSC 202, . . . ). Hence, each of the three length-31 M-sequence based scrambling codes can be concatenated with respective copies of themselves. For instance, each of the length-31 M-sequence based scrambling codes can be repeated with itself to yield length-62 scrambling codes.

By way of another example, the three possible scrambling codes can each be based upon a common M-sequence. Three different cyclic shifts (e.g., offsets, . . . ) of the same M-sequence can be used to yield the three possible scrambling codes. The M-sequence can be generated from a common generator polynomial (e.g., cyclic shift polynomial, . . . ). Further, three cyclic shifts can be employed to yield the three scrambling codes. According to an illustration, the cyclic shifts can be 0, 5, and 50. By way of further illustration, the cyclic shifts can be 0, 10, and 20. However, the claimed subject matter is not limited to the aforementioned illustrations since any three cyclic shifts can be used. Moreover, three length-63 scrambling codes can be yielded based upon the three cyclic shifts employed, and one bit from each of the three length-63 scrambling codes can be truncated or punctured, for instance. Alternatively, three length-31 scrambling codes can be generated based upon the three cyclic shifts utilized, and each of the length-31 scrambling codes can be repeated with itself to produce three length-62 scrambling codes.

According to a further example, the three possible scrambling codes can be based on a binary approximation of a respective one of the three possible PSCs. Each PSC can be generated from Zadoff-Chu (ZC) sequences. A binary approximation of a PSC can involve quantizing the I and Q values of each complex number included in the PSC to 1 or −1, thus yielding a corresponding scrambling code. For instance, a complex number included in a PSC such as 0.5+0.7j can be approximated to 1+j, while a second complex number such as −0.1+0.4j can be approximated to −1+j. Further, lengths of the resultant scrambling codes can be adjusted as described herein (e.g., reduced by truncating and/or puncturing bits, increased by repeating scrambling codes, . . . ).

Pursuant to another example, the three possible scrambling codes can each be based on a respective one of three different Golay complementary sequences. Golay complementary sequences can be, for instance, $2^M$ bits long, where M can be a positive integer. Thus, each Golay complementary sequence can be truncated, if necessary, to a length of N bits. By way of illustration, if each Golay complementary sequence should be 63 bits, then Golay complementary sequences of 64 bits can be generated and one bit truncation can be applied to each sequence; hence, three Golay complementary sequences that fit a size of the possible SSCs can be yielded. Further, each of the Golay complementary sequences can be repeated if the actual lengths of each sequence are less than desired lengths for the sequences.

Figure 3:
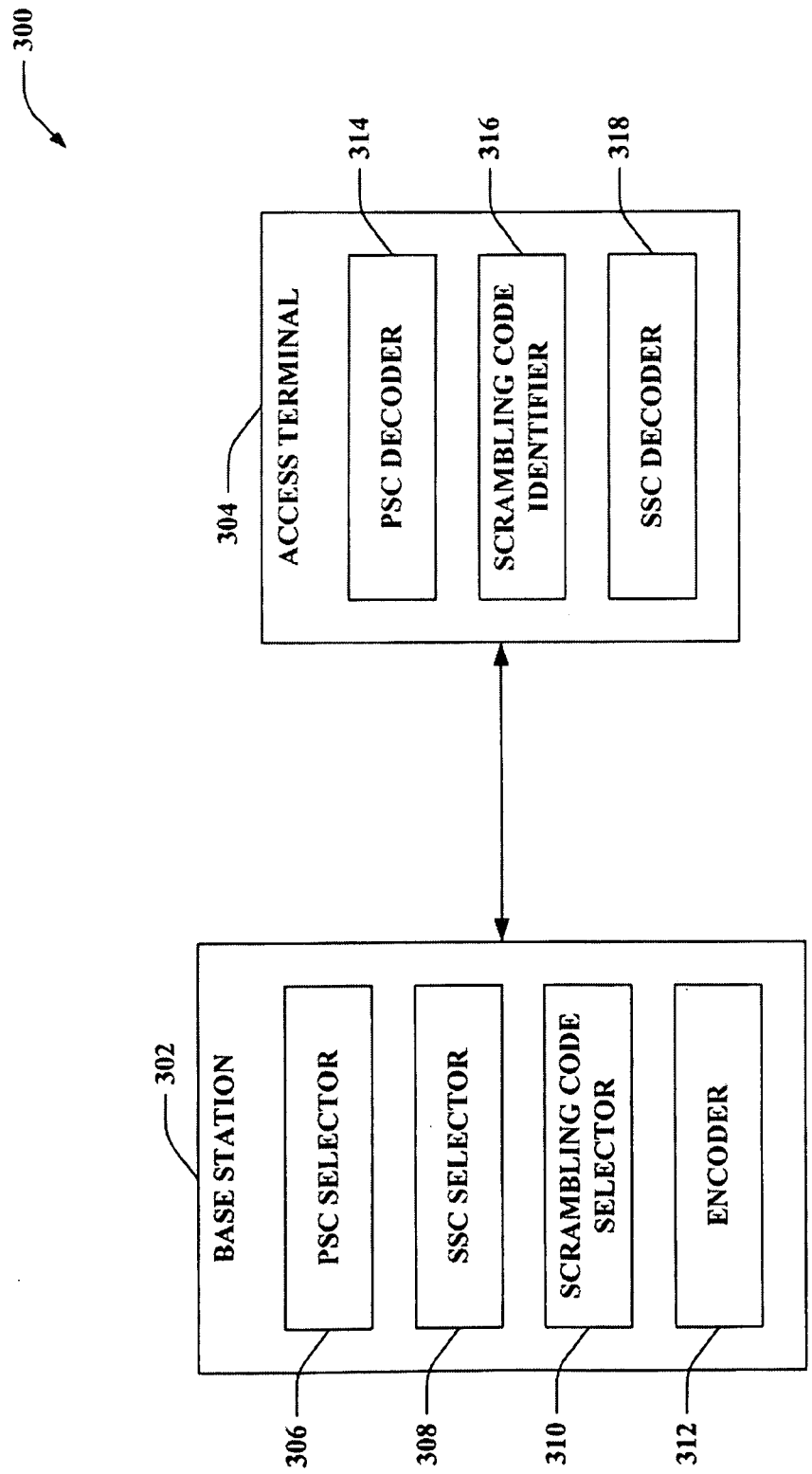
FIG. 3 is an illustration of an example system that enables utilizing scrambling codes for secondary synchronization codes in a wireless communication environment.

Referring to FIG. 3, illustrated is a system 300 that enables utilizing scrambling codes for secondary synchronization codes in a wireless communication environment. System 300 includes a base station 302 that can transmit and/or receive information, signals, data, instructions, commands, bits, symbols, and the like. Base station 302 can communicate with an access terminal 304 via the forward link and/or reverse link. Access terminal 304 can transmit and/or receive information, signals, data, instructions, commands, bits, symbols, and the like. Although not shown, it is to be appreciated that system 300 can include any number of disparate base stations similar to base station 302 and/or any number of disparate access terminals similar to access terminal 304.

Base station 302 can further include a PSC selector 306, an SSC selector 308, a scrambling code selector 310 and an encoder 312. PSC selector 306 can obtain, identify, and/or generate a PSC to be employed by base station 302. For instance, the PSC can be identified by PSC selector 306 from a set of potential PSCs (e.g., this set can include three possible PSCs, . . . ). Moreover, the PSC can be transmitted over a downlink (e.g., to access terminal 304, . . . ).

Further, SSC selector 308 can obtain, identify, and/or generate an SSC to be utilized by base station 302. The SSC can be identified by SSC selector 308 from a set of potential SSCs (e.g., this set can include 170 possible SSCs, . . . ). Moreover, the combination of the PSC chosen for use by PSC selector 306 and the SSC chosen for use by the SSC selector 308 can be used to indicate a cell ID associated with base station 302. According to another example, it is to be appreciated that the PSC and the SSC utilized by base station 302 can be predefined; however, the claimed subject matter is not so limited.

Scrambling code selector 310 can choose a particular scrambling code from a set of scrambling codes to be utilized by base station 302. For instance, the scrambling code identified by scrambling code selector 310 can be linked to the PSC identified by PSC selector 306 for use with base station 302. Further, one of three possible scrambling codes can be chosen by scrambling code selector 310 (e.g., assuming that three possible PSCs are utilized by a wireless communication environment, . . . ).

The three possible scrambling codes can be predefined (e.g., base station 302, any disparate base station(s) (not shown), access terminal 304, and any disparate access terminal(s) (not shown) can have a priori knowledge of the three possible scrambling codes, . . . ), for instance. Additionally or alternatively, scrambling code selector 310 can generate the three possible scrambling codes. According to an example, the three possible scrambling codes can include three different M-sequences generated from three different polynomials. Pursuant to another example, the three possible scrambling codes can each be generated from the same M-sequence, each with distinct cyclic shifts associated with the M-sequence. By way of a further example, the three possible scrambling codes can each be based upon a binary approximation of a respective, corresponding one of the three possible PSCs. In accordance with another example, the three possible scrambling codes can be based on three different Golay complementary sequences (e.g., with one bit truncation to match lengths of the Golay complementary sequences to lengths of the SSCs, . . . ). Further, the three possible scrambling codes can be designed to optimize a peak-to-average power ratio and mitigate cross-correlation between different codes. Moreover, scrambling code selector 310 can alter a length of the chosen scrambling code (e.g., reduced by truncating and/or puncturing bits, increased by repeating scrambling codes, . . . ).

Further, encoder 312 can utilize the scrambling code elected by scrambling code selector 310 to scramble the SSC. According to another illustration, encoder 312 can interleave short M-sequences (e.g., each of length-31, . . . ) to form the SSC. Following this illustration, it is contemplated that encoder 312 can interleave the short M-sequences to form the SSC prior or subsequent to applying the scrambling code. Moreover, the scrambled SSC can be transmitted over the downlink (e.g., to access terminal 304, . . . ).

Access terminal 304 can further include a PSC decoder 314, a scrambling code identifier 316, and an SSC decoder 318. PSC decoder 314 can evaluate a PSC received from base station 302 to recognize an identity of the PSC (e.g., determine an index associated with the PSC, match the PSC to one of the three possible PSCs, . . . ). Based upon the recognized PSC index, scrambling code identifier 316 can identify a scrambling code utilized by base station 302 (e.g., chosen by scrambling code selector 310, utilized by encoder 312 to scramble the SSC, . . . ). Thus, scrambling code identifier 316 can have a priori knowledge of the three possible scrambling codes utilized in system 300. Additionally or alternatively, scrambling code identifier 316 can generate the three possible scrambling codes in a substantially similar manner as employed by scrambling code selector 310 for generating the three possible scrambling codes, for instance. Further, SSC decoder 318 can use the identified scrambling code to decrypt a scrambled SSC received from base station 302 to determine an identity of the SSC (e.g., determine an index associated with the SSC, match the SSC to one of the 170 possible SSCs, . . . ). Upon determining identities of the PSC and the SSC utilized by base station 302, access terminal 304 can decipher a cell ID corresponding to base station 302. Additional information related to timing, sequencing, and the like can also be obtained based upon the determined identities of the PSC and the SSC.

The following can generally describe various aspects associated with the claimed subject matter. For instance, system 300 can be part of a General Packet Radio Services (GPRS) system. The GPRS system is a ubiquitous wireless communication system that is used by GSM access terminals for transmitting Internet Protocol (IP) packets. The GPRS Core Network (an integrated part of the GSM core network) is a part of the GPRS system that provides support for Wideband Code Division Multiple Access (WCDMA) based 3G networks. The GPRS Core Network can provide mobility management, session management and transport for Internet Protocol packet services in GSM and WCDMA networks.

GPRS Tunneling Protocol (GTP) is an IP protocol of the GPRS core network. GTP can enable end users of a GSM or WCDMA network to move from place to place while continuing to connect to the Internet as if from one location at a particular Gateway GPRS Support Node (GGSN). It does this by carrying subscriber's data from a subscriber's current Serving GPRS Support Node (SGSN) to the GGSN which is handling the subscriber's session. Three forms of GTP are used by the GPRS core network including (1) GTP-U: for transfer of user data in separated tunnels for each packet data protocol (PDP) context; (2) GTP-C: for control reasons such as setup and deletion of PDP contexts and verification of GSN reachability updates as subscribers move from one SGSN to another; and (3) GTP: for transfer of charging data from GSNs to the charging function.

GPRS Support Nodes (GSN) are network nodes that support the use of GPRS in the GSM core network. There are two key variants of the GSN including Gateway GPRS Support Node (GGSN) and Serving GPRS Support Node (SGSN).

A GGSN can provide an interface between the GPRS backbone network and the external packet data networks (e.g., radio network and the IP network). It can convert GPRS packets coming from the SGSN into the appropriate packet data protocol (PDP) format (e.g., IP or X.25) and send the converted packets to the corresponding packet data network. In the other direction, PDIP addresses of incoming data packets can be converted to the GSM address of a destination user. The readdressed packets can then be sent to the responsible SGSN. For this purpose, the GGSN can store the current SGSN address of the user and his or her profile in its location register. The GGSN can provide IP address assignment and is generally the default router for a particular access terminal (e.g., access terminal 304, . . . ).

In contrast, an SGSN can be responsible for the delivery of data packets from/to access terminals within its geographical service area. The tasks of an SGSN can include packet routing and transfer, mobility management, logical link management, authentication and charging functions.

The GPRS tunneling protocol for the user plane (GTP-U) layer can be used on the user-plane (U-plane) and is useful for transmitting user data in a packet switched area. Packet switched networks in the Universal Mobile Telecommunications System (UMTS) are based on GPRS, and therefore, the GTP-U can also be used in the UMTS. UMTS is one of the third-generation (3G) cell phone technologies. UMTS is sometimes referred to as 3GSM, which hints at both its 3G background and the GSM standard for which it was designed to succeed.

As described herein, synchronization signals can be sent by base stations (e.g., base station 302, . . . ). For LTE, there can be 510 unique physical-layer cell identities. The physical-layer cell identities can be grouped into 170 unique physical-layer cell-identity groups with each group containing three unique identities. The grouping can be such that each physical-layer cell identity can be a part of one and only one physical-layer cell-identity group. A physical-layer cell identity can be thus uniquely defined by a number in the range of 0 to 169 (e.g., chosen by SSC selector 308, recognized by SSC decoder 318, . . . ), representing the physical-layer cell-identity group, and a number in the range of 0 to 2 (e.g., identified by PSC selector 306, recognized by PSC decoder 314, . . . ), representing the physical-layer identity within the physical-layer cell-identity group.

Primary Synchronization Codes (PSCs) can be generally used for symbol timing detection. For example, a base station (e.g., base station 302, . . . ) can use a PSC to enable a number of access terminals (e.g., access terminal 304, any number of disparate access terminal(s) (not shown), . . . ) to determine the symbol timing of messages broadcasted by the base station.

Generally, the sequence used for a primary synchronization code in a cell can be selected (e.g., by PSC selector 306, . . . ) from a set of three different sequences with there being a one-to-one mapping between the three physical-layer cell identities within the physical-layer cell-identity group and the three sequences used for the primary synchronization signal. The sequence $d(n)$ can be used for the primary syn chronization code, and can be generated from a frequency-domain Zadoff-Chu (ZC) sequence according to:

$$d_u(n) = \begin{cases} e^{j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u is given as follows. A physical-layer cell identity within the physical layer cell-identity group of 0 can correspond to a root index u of 25, a physical-layer cell identity within the physical layer cell-identity group of 1 can correspond to a root index u of 29, and a physical-layer cell identity within the physical layer cell-identity group of 2 can correspond to a root index u of 34.

A mapping of a sequence (e.g., PSC, . . . ) to resource elements can depend on the frame structure. In various embodiments, the antenna port used for transmission of a primary synchronization signal may not be specified.

For frame structure type 1, the primary synchronization signal can be transmitted in slots 0 and 10 and the sequence d(n) can be mapped to the resource elements according to $$a_{k,l} = d(n), \quad k = n - 31 + \left\lfloor \frac{N_{RB}^{DL} N_{sc}^{RB}}{2} \right\rfloor, \quad l = N_{symb}^{DL} - 1, \quad n = 0, \ldots, 61.$$

Resource elements (k,l) in slots 0 and 10 where $$k = n - 31 + \left\lfloor \frac{N_{RB}^{DL} N_{sc}^{RB}}{2} \right\rfloor, \quad l = N_{symb}^{DL} - 1,$$

$$n = -5, -4, \ldots, -1, 62, 63, \ldots, 66$$

are reserved and not used for transmission of the primary synchronization signal.

For frame structure type 2, the primary synchronization signal can be transmitted in the DwPTS field.

Secondary Synchronization codes (SSCs) can be use to synchronize various wireless devices at a higher level as compared to PSCs. For example, a base station (e.g., base station 302, . . . ) can use an SSC to enable access terminals (e.g., access terminal 304, any disparate access terminal(s) (not shown), . . . ) to determine frame boundaries and the timing of a super-frame beacon.

In various embodiments, the sequence used for an secondary synchronization code can be an interleaved concatenation of two length-31 binary sequences obtained as cyclic shifts of a single length-31 M-sequence generated by a cyclic shift polynomial, e.g., $x^5+x^2+1$. The concatenated sequence is scrambled with a scrambling code given by the primary synchronization code (e.g., each primary synchronization code can have a one-to-one relation to a corresponding scrambling code, . . . ).

A mapping of a sequence (e.g., SSC, . . . ) to resource elements can depend on frame structure. In a subframe, the same antenna port as for the primary synchronization code can be used for the secondary synchronization code.

For frame structure type 1, the secondary synchronization code can be transmitted in slots 0 and 10 and the sequence d(n) can be mapped to the resource elements according to $$a_{k,l} = d(n), \quad k = n - 31 + \left\lfloor \frac{N_{RB}^{DL} N_{sc}^{RB}}{2} \right\rfloor, \quad l = N_{symb}^{DL} - 2, \quad n = 0, \ldots, 61.$$

Resource elements (k,l) in slots 0 and 10 where $$k = n - 31 + \left\lfloor \frac{N_{RB}^{DL} N_{sc}^{RB}}{2} \right\rfloor, \quad l = N_{symb}^{DL} - 2,$$

$$n = -5, -4, \ldots, -1, 62, 63, \ldots, 66$$

can be reserved and not used for transmission of the secondary synchronization code. For frame structure type 2, the secondary synchronization signal is transmitted in the last OFDM symbol of sub-frame 0.

Figure 4:
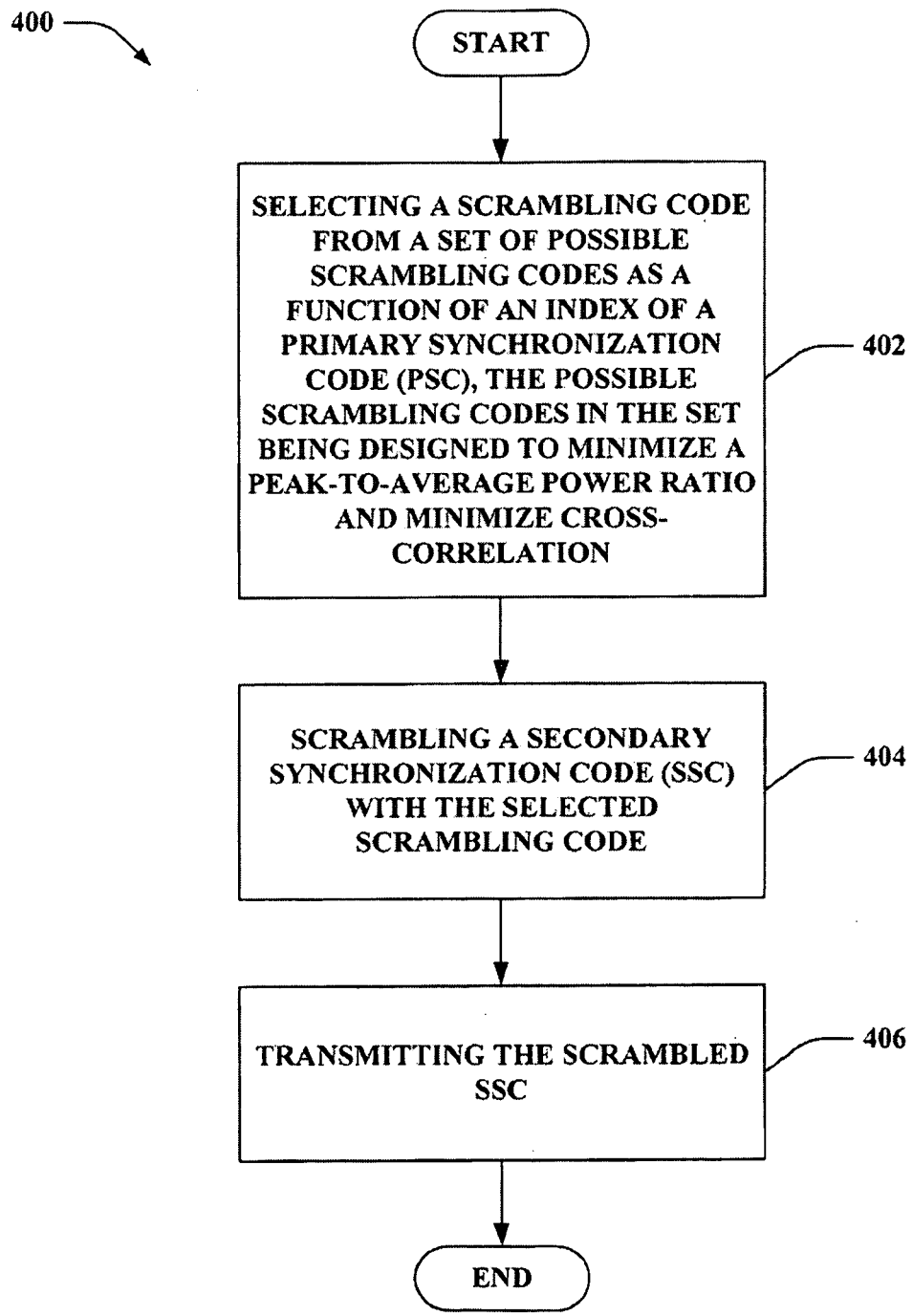
FIG. 4 is an illustration of an example methodology that facilitates scrambling synchronization codes in a wireless communication environment.
Figure 5:
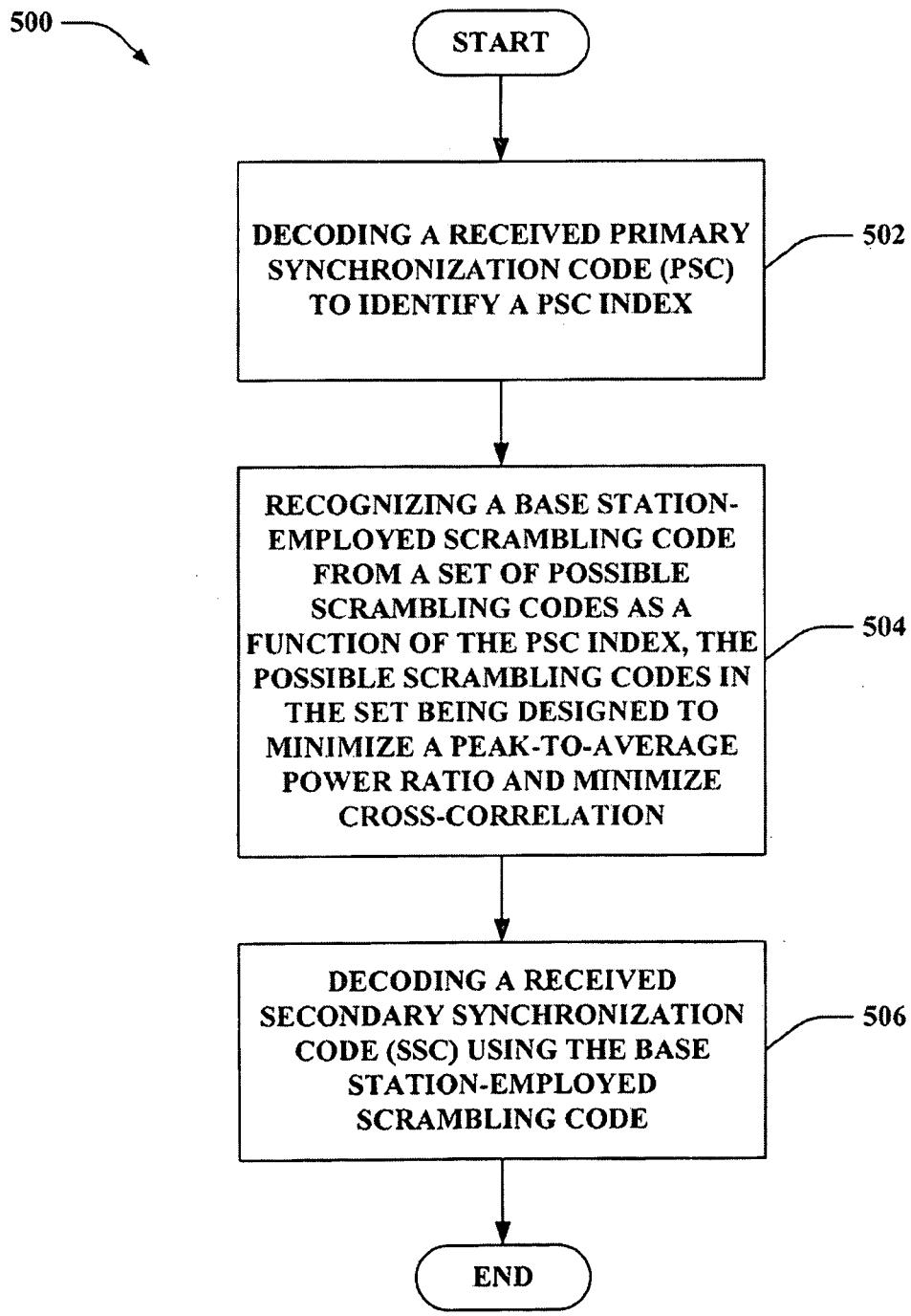
FIG. 5 is an illustration of an example methodology that facilitates descrambling received synchronization codes in a wireless communication environment.
Figure 6:
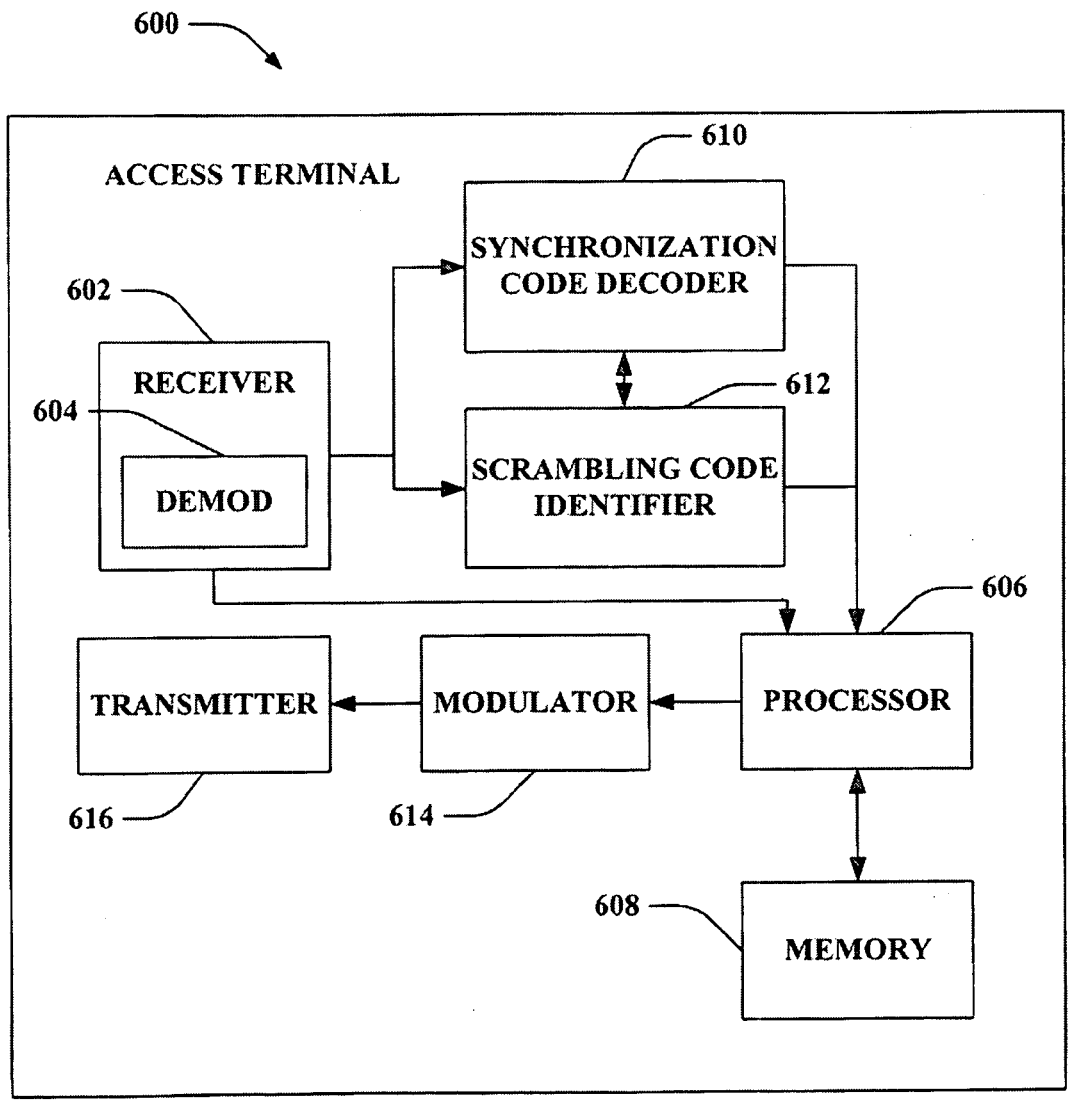
FIG. 6 is an illustration of an example access terminal that identifies a scrambling code employed by a base station in a wireless communication system.

Referring to FIGS. 4-6, methodologies relating to employing scrambling codes that optimize peak-to-average power ratios and/or cross correlation for scrambling secondary synchronization codes in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates scrambling synchronization codes in a wireless communication environment. At 402, a scrambling code can be selected from a set of possible scrambling codes as a function of an index of a primary synchronization code (PSC). The possible scrambling codes in the set can be designed to minimize a peak-to-average power ratio and minimize cross-correlation. In accordance with an example, the PSC can be selected from a set of possible PSCs. Further, the PSC can be transmitted.

The possible scrambling codes in the set can be generated, predefined, and so forth. According to an example, the possible scrambling codes in the set can each be based upon a distinct M-sequence, where each of the distinct M-sequences is generated from a disparate generator polynomial (e.g., differing cyclic shift polynomial, . . . ). By way of another example, the possible scrambling codes in the set can each be based upon a common M-sequence with a disparate cyclic shift, where the common M-sequence is generated from a common generator polynomial (e.g., common cyclic shift polynomial, . . . ). According to a further example, the possible scrambling codes in the set can each be based on a binary approximation of a respective PSC from a set of possible PSCs, where the possible PSCs can be generated from Zadoff-Chu (ZC) sequences. The binary approximation can include quantizing I and Q values of complex numbers in the PSCs to 1 or −1, for instance. Pursuant to another example, the possible scrambling codes can each be based on a respective Golay complementary sequence. Further, lengths of one or more of the possible scrambling codes can be adjusted. For instance, the lengths can be reduced by truncating or puncturing bits and/or the lengths can be increased by repeating the possible scrambling codes.

At 404, a secondary synchronization code (SSC) can be scrambled with the selected scrambling code. For instance, the SSC and the scrambling code can be multiplied together. Pursuant to another example, the SSC can be selected from a set of possible SSCs. At 406, the scrambled SSC can be transmitted.

Turning to FIG. 5, illustrated is a methodology 500 that facilitates descrambling received synchronization codes in a wireless communication environment. At 502, a received primary synchronization code (PSC) can be decoded to identify a PSC index. For instance, the received PSC can be recognized to match one PSC from a set of possible PSCs, and the PSC index can correspond to this matching PSC.

At 504, a base station-employed scrambling code from a set of possible scrambling codes can be recognized as a function of the PSC index. Further, the possible scrambling codes in the set can be designed to minimize a peak-to-average power ratio and minimize cross correlation. The possible scrambling codes in the set can be generated, predefined, and so forth. According to an example, the possible scrambling codes in the set can each be based upon a distinct M-sequence, where each of the distinct M-sequences is generated from a disparate generator polynomial (e.g., differing cyclic shift polynomial, . . . ). By way of another example, the possible scrambling codes in the set can each be based upon a common M-sequence with a disparate cyclic shift, where the common M-sequence is generated from a common generator polynomial (e.g., common cyclic shift polynomial, . . . ). According to a further example, the possible scrambling codes in the set can each be based on a binary approximation of a respective PSC from the set of possible PSCs, where the possible PSCs can be generated from Zadoff-Chu (ZC) sequences. The binary approximation can include quantizing I and Q values of complex numbers in the PSCs to 1 or −1, for instance. Pursuant to another example, the possible scrambling codes can each be based on a respective Golay complementary sequence. Further, lengths of one or more of the possible scrambling codes can be altered. For instance, the lengths can be reduced by truncating or puncturing bits and/or the lengths can be increased by repeating the possible scrambling codes.

At 506, a received secondary synchronization code (SSC) can be decoded using the base station-employed scrambling code. For instance, the received SSC can be scrambled, and the base station-employed scrambling code can be leveraged to descramble the received SSC.

It will be appreciated that, in accordance with one or more aspects described herein, inferences can be made regarding scrambling and/or descrambling secondary synchronization codes in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining a length of a scrambling code to be utilized for scrambling or descrambling an SSC. By way of further illustration, an inference can be made related to determining an optimal set of possible scrambling codes to employ. It will be appreciated that the foregoing examples are illustrative in nature and are not intended to limit the number of inferences that can be made or the manner in which such inferences are made in conjunction with the various embodiments and/or methods described herein.

FIG. 6 is an illustration of an access terminal 600 that identifies a scrambling code employed by a base station in a wireless communication system. Access terminal 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of access terminal 600, and/or a processor that both analyzes information received by receiver 602, generates information for transmission by transmitter 616, and controls one or more components of access terminal 600.

Access terminal 600 can additionally comprise memory 608 that is operatively coupled to processor 606 and that can store data to be transmitted, received data, and any other suitable information related to performing the various actions and functions set forth herein. Memory 608, for instance, can store protocols and/or algorithms associated with analyzing received synchronization code(s) (e.g., PSC(s), SSC(s), . . . ) obtained from a base station. Further, memory 608 can store protocols and/or algorithms for recognizing (e.g., based upon evaluation of received PSC(s), . . . ) a scrambling code utilized by the base station that sends the synchronization code(s) and/or descrambling SSC(s) obtained from such base station by leveraging the recognized scrambling code.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Receiver 602 is further operatively coupled to a synchronization code decoder 610 and/or a scrambling code identifier 612. Although access terminal 600 includes synchronization code decoder 610, it is to be appreciated that access terminal can include PSC decoder 314 of FIG. 3 and/or SSC decoder 318 of FIG. 3 (and/or synchronization code decoder 610 can be substantially similar to PSC decoder 314 and/or SSC decoder 318). Moreover, scrambling code identifier 612 can be substantially similar to scrambling code identifier 316 of FIG. 3. Synchronization code decoder 610 can evaluate received PSCs and/or SSCs. For instance, synchronization code decoder 610 can identify a PSC index associated with a received PSC. Further, scrambling code identifier 612 can determine a scrambling code that corresponds to the identified PSC index. Thereafter, synchronization code decoder 610 can descramble a received, scrambled SSC by leveraging the determined scrambling code. Access terminal 600 still further comprises a modulator 614 and a transmitter 616 that transmits the signal to, for instance, a base station, another access terminal, etc. Although depicted as being separate from the processor 606, it is to be appreciated that synchronization code decoder 610, scrambling code identifier 612 and/or modulator 614 can be part of processor 606 or a number of processors (not shown).

Figure 7:
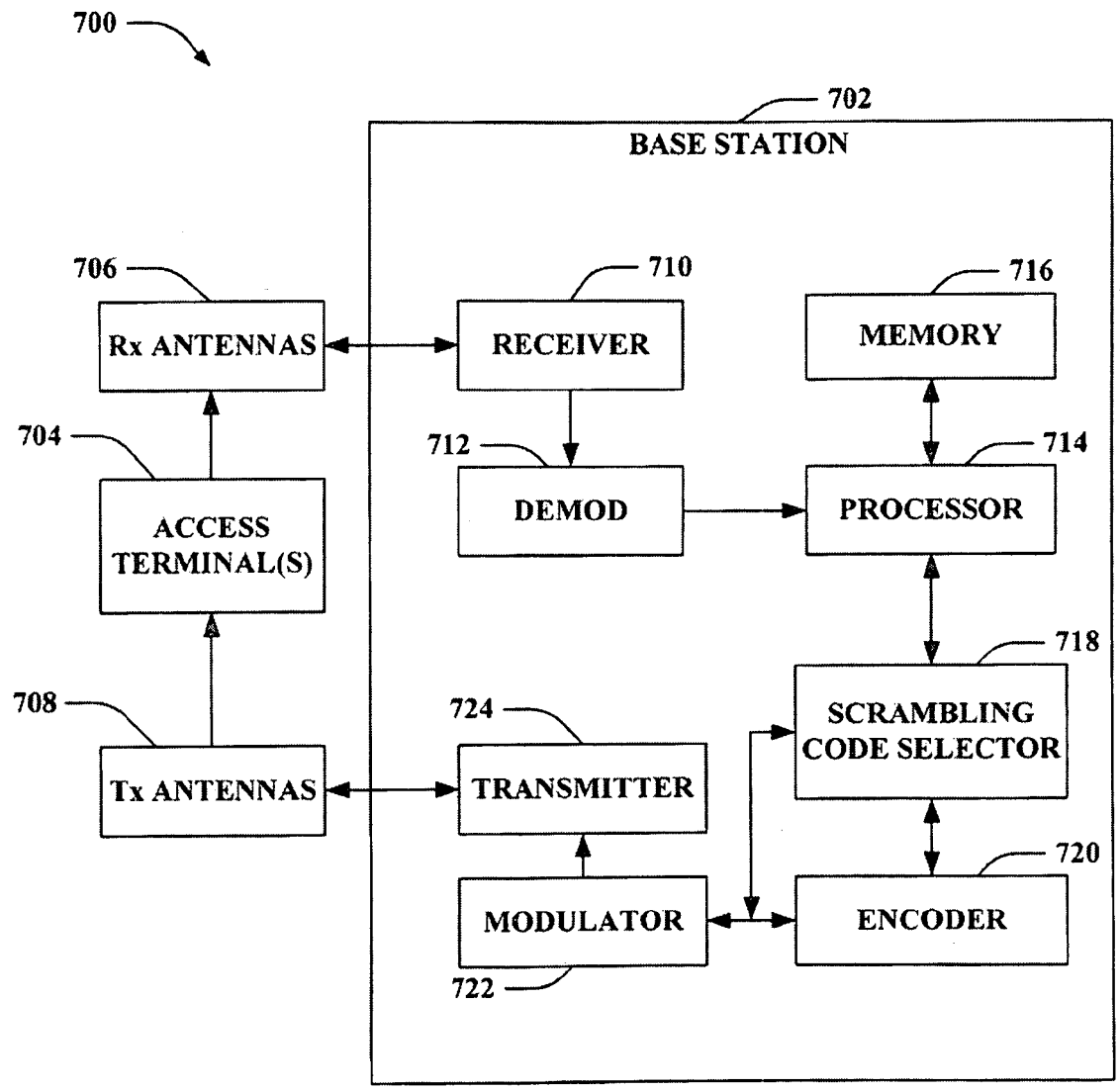
FIG. 7 is an illustration of an example system that scrambles an SSC utilizing a scrambling code in a wireless communication environment.

FIG. 7 is an illustration of a system 700 that scrambles an SSC utilizing a scrambling code in a wireless communication environment. System 700 comprises a base station 702 (e.g., access point, ...) with a receiver 710 that receives signal(s) from one or more access terminals 704 through a plurality of receive antennas 706, and a transmitter 724 that transmits to the one or more access terminals 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores data to be transmitted to or received from access terminal(s) 704 (or a disparate base station (not shown)) and/or any other suitable information related to performing the various actions and functions set forth herein. Processor 714 is further coupled to a scrambling code selector 718 that can select a scrambling code from a set of possible scrambling codes for use by base station 702. Scrambling code selector 718 can elect the scrambling code based upon a PSC (e.g., from a set of PSCs, ...) utilized by base station 702. Further, the possible scrambling codes can be optimized to mitigate peak-to-average power ratios while reducing cross-correlation there between. Moreover, base station 702 can additionally include an encoder 720 that can scramble an SSC utilizing the scrambling code selected by scrambling code selector 718. It is to be appreciated that encoder 720 can be substantially similar to encoder 312 of FIG. 3. Further, although not shown, it is contemplated that base station 702 can include a PSC selector substantially similar to PSC selector 306 of FIG. 3 and/or an SSC selector substantially similar to SSC selector 308 of FIG. 3. Moreover, encoder 720 can provide the scrambled SSC to be transmitted to a modulator 722. Modulator 722 can multiplex a frame for transmission by a transmitter 724 through antennas 708 to access terminal(s) 704. Although depicted as being separate from the processor 714, it is to be appreciated that scrambling code selector 718, encoder 720, and/or modulator 722 can be part of processor 714 or a number of processors (not shown).

Figure 8:
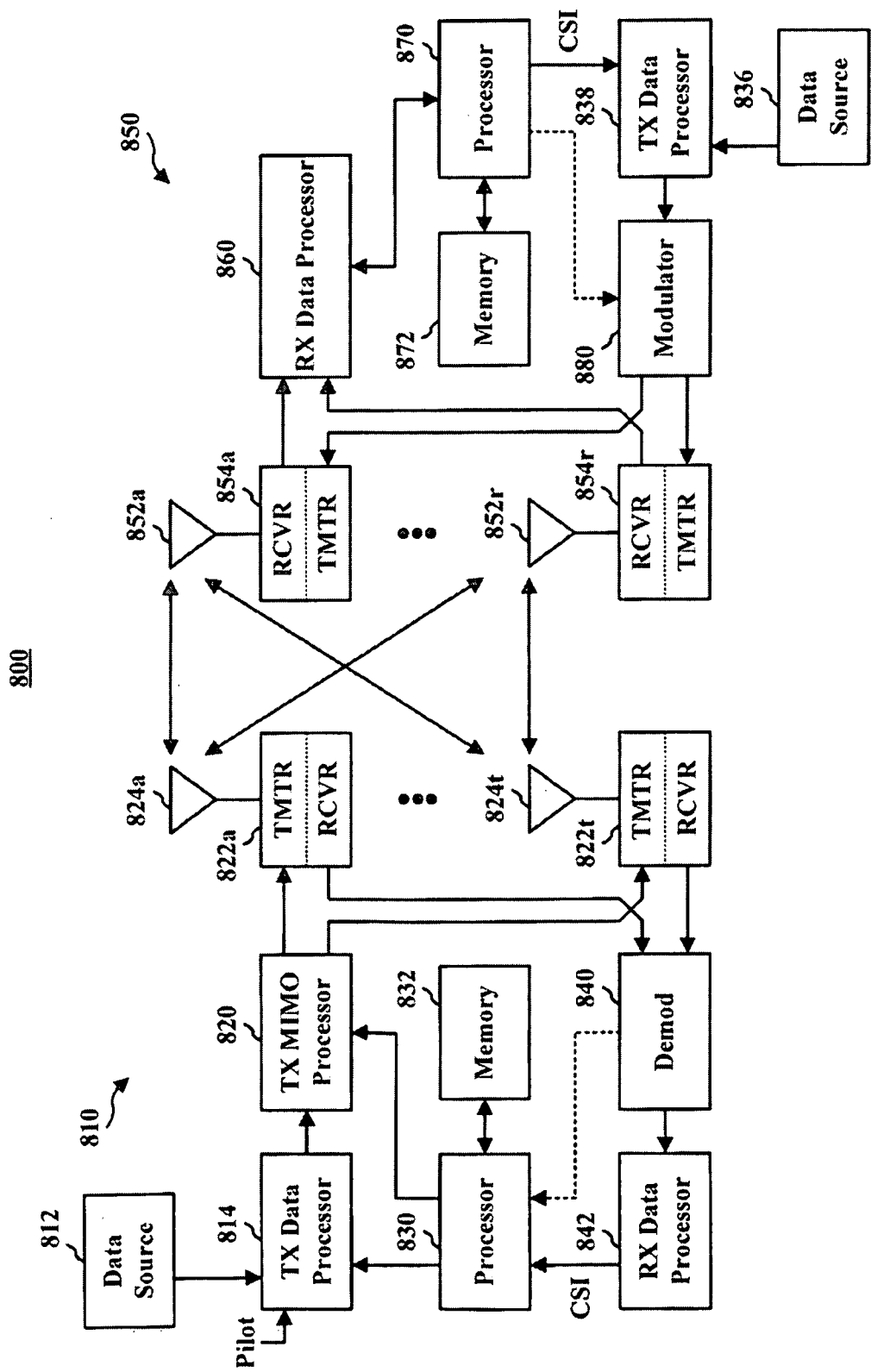
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-3, 6-7, and 9-10) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which precoding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
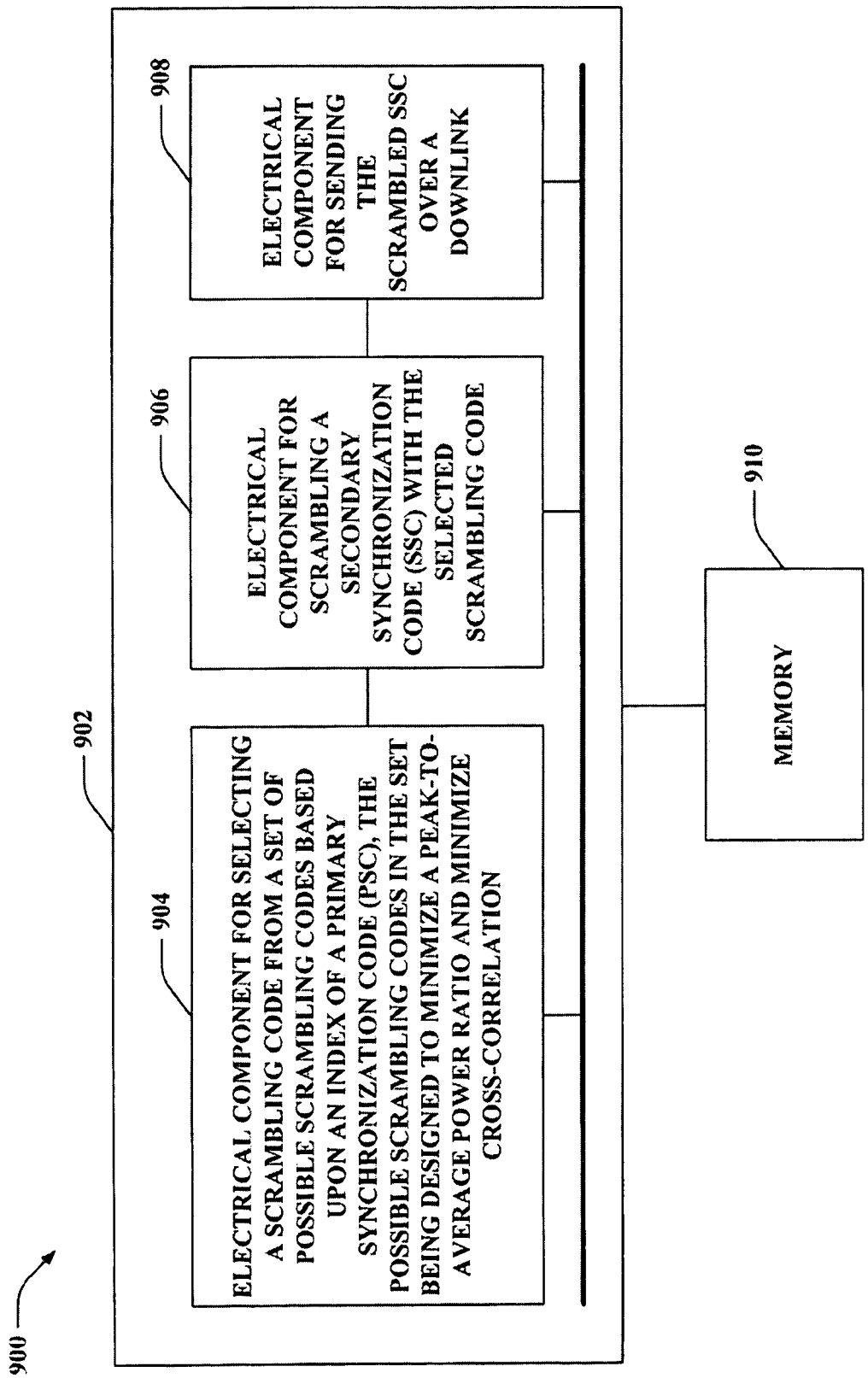
FIG. 9 is an illustration of an example system that enables employing scrambling signals for a secondary synchronization code in a wireless communication environment.

With reference to FIG. 9, illustrated is a system 900 that enables employing scrambling signals for a secondary synchronization code in a wireless communication environment. For example, system 900 can reside at least partially within a base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for selecting a scrambling code from a set of possible scrambling codes based upon an index of a primary synchronization code (PSC), the possible scrambling codes in the set being designed to minimize a peak-to-average power ratio and minimize cross-correlation 904. Moreover, logical grouping 902 can include an electrical component for scrambling a secondary synchronization code (SSC) with the selected scrambling code 906. Further, logical grouping 902 can include an electrical component for sending the scrambled SSC over a downlink 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
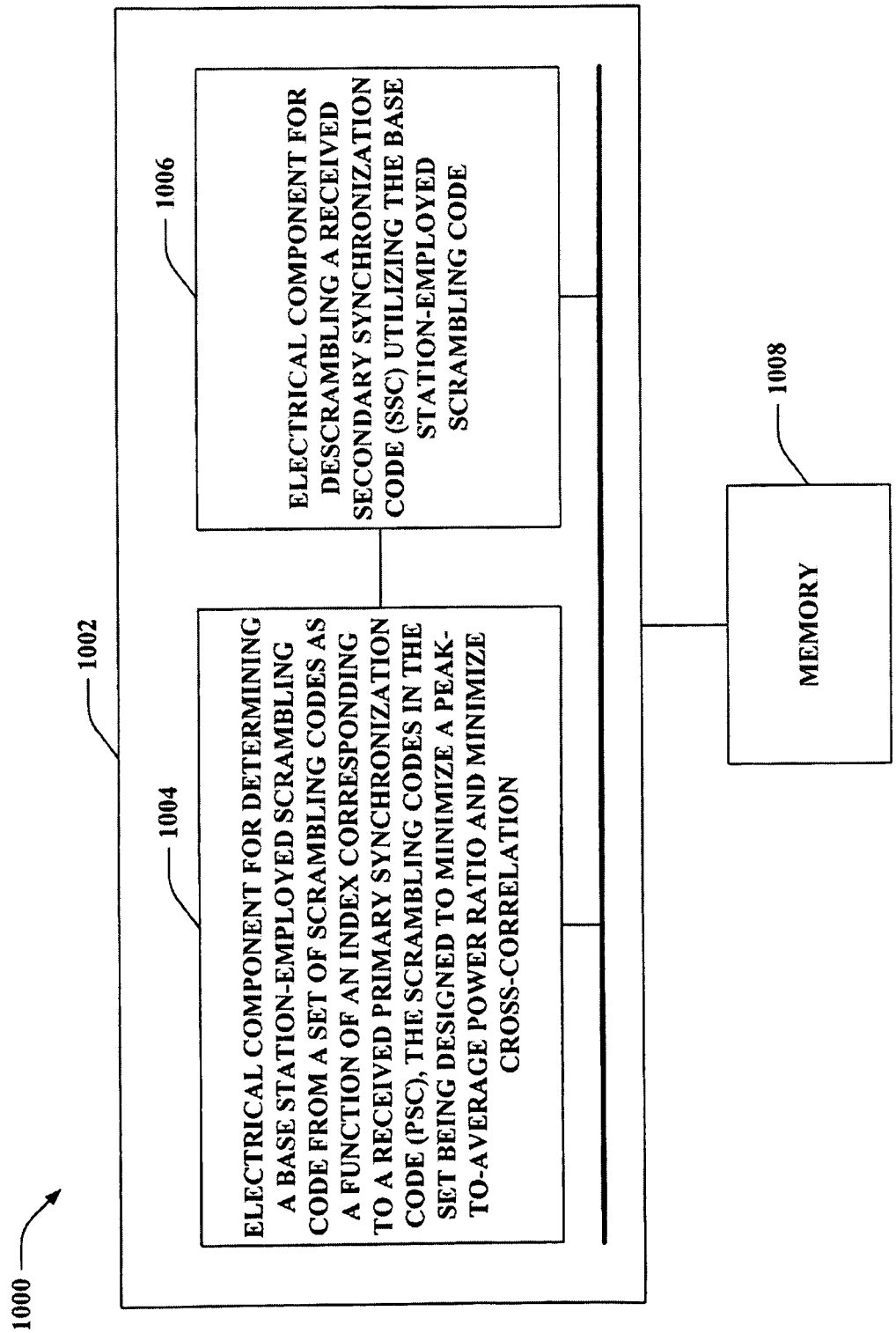
FIG. 10 is an illustration of an example system that enables descrambling a received secondary synchronization code in a wireless communication environment.

Turning to FIG. 10, illustrated is a system 1000 that enables descrambling a received secondary synchronization code in a wireless communication environment. System 1000 can reside within an access terminal, for instance. As depicted, system 1000 includes functional blocks that can represent functions implemented by a processor, software, or combination thereof (e.g., firmware). System 1000 includes a logical grouping 1002 of electrical components that can act in conjunction. Logical grouping 1002 can include an electrical component for determining a base station-employed scrambling code from a set of scrambling codes as a function of an index corresponding to a received primary synchronization code (PSC) 1004. For instance, the scrambling codes in the set can be designed to minimize a peak-to-average power ratio and minimize cross-correlation. Moreover, logical grouping 1002 can include an electrical component for descrambling a received secondary synchronization code (SSC) utilizing the base station-employed scrambling code 1006. Additionally, system 1000 can include a memory 1008 that retains instructions for executing functions associated with electrical components 1004 and 1006. While shown as being external to memory 1008, it is to be understood that electrical components 1004 and 1006 can exist within memory 1008.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates scrambling synchronization codes in a wireless communication environment, comprising:
   selecting a scrambling code from a set of possible scrambling codes as a function of an index of a primary synchronization code (PSC), the possible scrambling codes in the set being designed to minimize a peak-to-average power ratio and minimize a cross-correlation, wherein the possible scrambling codes in the set are each based upon a common maximum-length sequence (M-sequence) with a different cyclic shift, and the common M-sequence is generated from a common generator polynomial;
   scrambling a secondary synchronization code (SSC) with the selected scrambling code; and
   transmitting the scrambled SSC.

2. The method of claim 1, further comprising generating the possible scrambling codes.

3. The method of claim 1, further comprising adjusting a length of one or more of the possible scrambling codes by at least one of truncating a bit, puncturing a bit, or repeating the one or more of the possible scrambling codes.

4. A wireless communications apparatus, comprising:
   a memory that retains instructions for selecting a scrambling code from a set of possible scrambling codes as a function of an index of a primary synchronization code (PSC), the possible scrambling codes in the set being designed to minimize a peak-to-average power ratio and minimize a cross-correlation, scrambling a secondary synchronization code (SSC) with the selected scrambling code, and transmitting the scrambled SSC, wherein the possible scrambling codes in the set are each based upon a common maximum-length sequence (M-sequence) with a different cyclic shift, and the common M-sequence is generated from a common generator polynomial; and
   a processor, coupled to the memory, configured to execute the instructions retained in the memory.

5. The wireless communications apparatus of claim 4, wherein the memory further retains instructions for generating the common M-sequence from the common generator polynomial, and creating the possible scrambling codes in the set based upon the common M-sequence and differing, respective cyclic shifts.

6. The wireless communications apparatus of claim 4, wherein the memory further retains instructions for altering a length of one or more of the possible scrambling codes in the set.

7. A wireless communications apparatus that enables employing scrambling signals for a secondary synchronization code in a wireless communication environment, comprising:
   means for selecting a scrambling code from a set of possible scrambling codes based upon an index of a primary synchronization code (PSC), the possible scrambling codes in the set being designed to minimize a peak-to-average power ratio and minimize cross-correlation, wherein the possible scrambling codes in the set are each based upon a common maximum-length sequence (M-sequence) with a different cyclic shift, and the common M-sequence is generated from a common generator polynomial;
   means for scrambling a secondary synchronization code (SSC) with the selected scrambling code; and
   means for sending the scrambled SSC over a downlink.

8. The wireless communications apparatus of claim 7, further comprising:
   means for generating the possible scrambling codes; and
   means for adjusting lengths of at least one of the possible scrambling codes to match a length of the SSC.

9. A computer program product, comprising:
   a non-transitory computer-readable medium comprising:
      code for selecting a scrambling code from a set of possible scrambling codes as a function of an index of a primary synchronization code (PSC), the possible scrambling codes in the set being designed to minimize a peak-to-average power ratio and minimize a cross-correlation, wherein the possible scrambling codes in the set are each based upon a common maximum-length sequence (M-sequence) with a different cyclic shift, and the common M-sequence is generated from a common generator polynomial;
      code for scrambling a secondary synchronization code (SSC) with the selected scrambling code; and
      code for transmitting the scrambled SSC.

10. The computer program product of claim 9, wherein the computer-readable medium further comprises code for generating the common M-sequence from the common generator polynomial, and code for creating the possible scrambling codes in the set based upon the common M-sequence and differing, respective cyclic shifts.

11. In a wireless communications system, an apparatus comprising:
   a processor configured to:
      select a scrambling code from a set of possible scrambling codes based upon an index of a primary synchronization code (PSC), the possible scrambling codes in the set being designed to minimize a peak-to-average power ratio and minimize cross-correlation, wherein the possible scrambling codes in the set are each based upon a common maximum-length sequence (M-sequence) with a different cyclic shift, and the common M-sequence is generated from a common generator polynomial; and scramble a secondary synchronization code (SSC) with the selected scrambling code.

12. A method that facilitates descrambling received synchronization codes in a wireless communication environment, comprising:

decoding a received primary synchronization code (PSC) to identify a PSC index;

recognizing a base station-employed scrambling code from a set of possible scrambling codes as a function of the PSC index, the possible scrambling codes in the set being designed to minimize a peak-to-average power ratio and minimize cross-correlation, wherein the possible scrambling codes in the set are each based upon a common maximum-length sequence (M-sequence) with a different cyclic shift, and the common M-sequence is generated from a common generator polynomial; and decoding a received secondary synchronization code (SSC) using the base station-employed scrambling code.

13. The method of claim 12, further comprising:

generating the common M-sequence from the common generator polynomial; and creating the possible scrambling codes in the set based upon the common M-sequence and differing, respective cyclic shifts.

14. The method of claim 12, wherein the possible scrambling codes in the set are predefined.

15. The method of claim 12, further comprising altering a length of one or more of the possible scrambling codes in the set.

16. A wireless communications apparatus, comprising:

a memory that retains instructions for decoding a received primary synchronization code (PSC) to identify a PSC index, recognizing a base station-employed scrambling code from a set of possible scrambling codes as a function of the PSC index, the possible scrambling codes in the set being designed to minimize a peak-to-average power ratio and minimize cross-correlation, and decoding a received secondary synchronization code (SSC) using the base station-employed scrambling code, wherein the possible scrambling codes in the set are each based upon a common maximum-length sequence (M-sequence) with a different cyclic shift, and the common M-sequence is generated from a common generator polynomial; and a processor, coupled to the memory, configured to execute the instructions retained in the memory.

17. The wireless communications apparatus of claim 16, wherein the memory further retains instructions for adjusting a length of one or more of the possible scrambling codes in the set by at least one of truncating, puncturing, or repeating.

18. A wireless communications apparatus that enables descrambling a received secondary synchronization code in a wireless communication environment, comprising:

means for determining a base station-employed scrambling code from a set of scrambling codes as a function of an index corresponding to a received primary synchronization code (PSC), the scrambling codes in the set being designed to minimize a peak-to-average power ratio and minimize cross-correlation, wherein the scrambling codes in the set are each based upon a common maximum-length sequence (M-sequence) with a different cyclic shift, and the common M-sequence is generated from a common generator polynomial; and means for descrambling a received secondary synchronization code (SSC) utilizing the base station-employed scrambling code.

19. The wireless communications apparatus of claim 18, further comprising means for altering a length of one or more of the scrambling codes in the set to match a length of the received SSC.

20. A computer program product, comprising:

a non-transitory computer-readable medium comprising:

code for determining a base station-employed scrambling code from a set of scrambling codes as a function of an index corresponding to a received primary synchronization code (PSC), the scrambling codes in the set being designed to minimize a peak-to-average power ratio and minimize cross-correlation, wherein the scrambling codes in the set are each based upon a common maximum-length sequence (M-sequence) with a different cyclic shift, and the common M-sequence is generated from a common generator polynomial; and code for descrambling a received secondary synchronization code (SSC) utilizing the base station-employed scrambling code.

21. The computer program product of claim 20, wherein the computer-readable medium further comprises code for generating the common M-sequence from the common generator polynomial, and code for creating the possible scrambling codes in the set based upon the common M-sequence and differing, respective cyclic shifts.

22. In a wireless communications system, an apparatus comprising:

a processor configured to:

determine a base station-employed scrambling code from a set of scrambling codes as a function of an index corresponding to a received primary synchronization code (PSC), the scrambling codes in the set being designed to minimize a peak-to-average power ratio and minimize cross-correlation, wherein the scrambling codes in the set are each based upon a common maximum-length sequence (M-sequence) with a different cyclic shift, and the common M-sequence is generated from a common generator polynomial; and descramble a received secondary synchronization code (SSC) utilizing the base station-employed scrambling code.

* * * * *